United States Patent
Li (10) Patent No.: US 12,202,676 B2
(45) Date of Patent: Jan. 21, 2025

(54) METHOD AND APPARATUS FOR SETTING OBJECT CONVEYING SPEED

(71) Applicant: BEIJING JINDONG ZHENSHI INFORMATION TECHNOLOGY CO., LTD., Beijing (CN)

(72) Inventor: Huachang Li, Beijing (CN)

(73) Assignee: BEIJING JINDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 177 days.

(21) Appl. No.: 17/796,864

(22) PCT Filed: Dec. 28, 2020

(86) PCT No.: PCT/CN2020/140222
§ 371 (c)(1),
(2) Date: Aug. 1, 2022

(87) PCT Pub. No.: WO2021/155724
PCT Pub. Date: Aug. 12, 2021

(65) Prior Publication Data
US 2023/0059088 A1    Feb. 23, 2023

(30) Foreign Application Priority Data

Feb. 6, 2020  (CN) .......................... 202010081702.2

(51) Int. Cl.
*B65G 23/30*   (2006.01)
*B65G 15/22*   (2006.01)
*B65G 43/10*   (2006.01)

(52) U.S. Cl.
CPC ............. *B65G 23/30* (2013.01); *B65G 15/22* (2013.01); *B65G 43/10* (2013.01)

(58) Field of Classification Search
None
See application file for complete search history.

(56) References Cited

U.S. PATENT DOCUMENTS

| | | | |
|---|---|---|---|
| 6,454,079 B1 * | 9/2002 | Teramoto | B65G 47/31 198/792 |
| 8,812,152 B1 * | 8/2014 | Giloh | B65G 23/30 700/229 |

(Continued)

FOREIGN PATENT DOCUMENTS

| | | |
|---|---|---|
| CN | 103674604 A | 3/2014 |
| CN | 204330632 U | 5/2015 |

(Continued)

OTHER PUBLICATIONS

Chinese Patent Office Search Report for Application No. 202010081702.2 dated Jun. 30, 2023 (3 pages, statement of relevance included).

(Continued)

*Primary Examiner* — Kavel Singh
(74) *Attorney, Agent, or Firm* — Michael Best & Friedrich LLP (57) ABSTRACT

Disclosed are a method and apparatus for setting an object conveying speed, relating to the technical field of computers. The method comprises: acquiring historical feature data of an object within multiple predefined time periods, and constructing a conveying speed level model, which indicates a corresponding relationship between the historical feature data and a conveying speed level, and which further includes a feature index that indicates the conveying speed level (S101); acquiring feature data of an object to be conveyed, and determining, by using the conveying speed level model, the conveying speed level of the object to be conveyed (S102); and determining the conveying speed of the object to be conveyed according to the conveying speed level (S103).

12 Claims, 6 Drawing Sheets

(56) References Cited

U.S. PATENT DOCUMENTS

| | | | |
|---|---|---|---|
| 9,592,965 B2* | 3/2017 | Tsujimoto | ............. B65G 43/10 |
| 2017/0073168 A1 | 3/2017 | Neiser et al. | |
| 2018/0075402 A1 | 3/2018 | Stadie et al. | |

FOREIGN PATENT DOCUMENTS

| | | | |
|---|---|---|---|
| CN | 107180420 A | 9/2017 | |
| CN | 109794437 A | 5/2019 | |
| EP | 3492944 A1 | 6/2016 | |
| JP | H09142638 A | 6/1997 | |
| JP | 2004123350 A | 4/2004 | |
| JP | H26027241 A | 2/2006 | |
| JP | 2017026355 A | 2/2017 | |
| JP | 2019034836 A | 3/2019 | |

OTHER PUBLICATIONS

Chinese Patent Office Notification on Registration and Formalities for Application No. 202010081702.2 dated Jul. 3, 2023 (2 page, statement of relevance included).
Chinese Patent Office Notification on Grant of Patent Right for Application No. 202010081702.2 dated Jul. 3, 2023 (2 page, statement of relevance included).
International Search Report and Written Opinion for Application No. PCT/CN2020/140222 dated Mar. 30, 2021 (9 pages including partial English translation).
Japanese Patent Office Notice of Reasons for Refusal for Application No. 2022-543506, dated Aug. 18, 2023 (10 pages, including English translation).
European Patent Office Action for Application No. 20917624.7 dated Feb. 14, 2024 (9 pages).

* cited by examiner

| Conveying speed level \ Data interval / Result value | First group of data | Second group of data | Third group of data | Fourth group of data | Fifth group of data |
|---|---|---|---|---|---|
| | 202 | 173 | 387 | 265 | 101 |
| | 206 | 173 | 379 | 265 | 57 |
| | 186 | 183 | 379 | 251 | 89 |
| | 182 | 183 | 320 | 251 | 89 |
| | 171 | 248 | 320 | 306 | 83 |
| | 171 | 248 | 270 | 306 | 83 |
| | 194 | 293 | 270 | 300 | 15 |
| | 197 | 301 | 367 | 221 | 15 |
| | 197 | 310 | 247 | 233 | 31 |
| | 138 | 288 | 250 | 246 | 31 |
| Data interval / Result value | [138, 206] | [173, 310] | [247, 387] | [221, 306] | [15, 101] |
| Level A | 0.0 | 0.02 | 0.452 | 0.016 | 0.0 |
| Upper Level B | 0.362 | 0.992 | 1 | 0.28 | 0.024 |
| Level B | 0.951 | 1 | 0.467 | 0.935 | 0.001 |
| Lower Level B | 0.987 | 0.691 | 0.065 | 0.191 | 0.845 |
| Level C | 0.05 | 0.004 | 0.0 | 0.0 | 1 |
| Corresponding speed level | Level B | Level B | Upper Level B | Upper Level B | Level C |

METHOD AND APPARATUS FOR SETTING OBJECT CONVEYING SPEED

CROSS-REFERENCE TO RELATED APPLICATION(S)

This is a U.S. national stage entry of International Patent Application No. PCT/CN2020/140222, filed on Dec. 28, 2020, which claims priority to Chinese Patent Application No. 202010081702.2, filed on Feb. 6, 2020, the entire contents of each of which are fully incorporated herein by reference.

TECHNICAL FIELD

The disclosure relates to the technical field of computers, and in particular relates to a method and apparatus for setting an object conveying speed.

BACKGROUND ART

Various conveying devices are widely used in logistics parks. Packages are packed in warehouses and transferred to sorting centers through the conveying devices, which become indispensable guarantees for rapid development of logistics.

As found by the inventor during the implementation of the disclosure, the prior art has at least the following problems:

Specific speeds of various conveying devices are manually set, and the speeds cannot be adjusted in real time according to factors such as the weight and quantity of the conveyed packages, so the packages are still conveyed in a comparatively fast fixed speed in a case where the quantity of the packages is particularly small, which results in a cost waste, and the speed cannot be adjusted to a comparatively fast conveying speed when the quantity of the packages is comparatively large, which results in a reduced efficiency.

SUMMARY OF THE INVENTION

In view of this, an embodiment of the disclosure provides a method and apparatus for setting an object conveying speed, which can grade factors that affect a speed of a conveying device, and set the conveying speed of the conveying device by means of a relationship between the level and the conveying speed within a preset time period, so as to achieve intelligent adjustment of the conveying speed of the conveying device, thereby reducing the conveying cost of the conveying device, and improving the conveying efficiency of the conveying device.

In order to achieve the aforesaid object, according to one aspect of the embodiment of the disclosure, a method for setting an object conveying speed is provided, the method being characterized by comprising: acquiring historical feature data of an object within multiple predefined time periods, and constructing a conveying speed level model, which indicates a corresponding relationship between the historical feature data and a conveying speed level, and which further includes a feature index that indicates the conveying speed level; acquiring feature data of an object to be conveyed, and determining, by using the conveying speed level model, the conveying speed level of the object to be conveyed; and determining the conveying speed of the object to be conveyed according to the conveying speed level.

Optionally, the method for setting an object conveying speed is characterized in that the feature data of the object to be conveyed includes the weight and quantity of the objects to be conveyed within one of the predefined time periods.

Optionally, the method for setting an object conveying speed is characterized in that acquiring feature data of an object to be conveyed further includes acquiring the feature data of the object to be conveyed within the multiple predefined time periods, and acquiring the maximum value and the minimum value of the feature data.

Optionally, the method for setting an object conveying speed is characterized in that determining, by using the conveying speed level model, the conveying speed level of the object to be conveyed includes: determining the conveying speed level of the object according to the conveying speed level model to which the feature index belongs when the feature index is not smaller than the minimum value of the feature data and not greater than the maximum value of the feature data.

Optionally, the method for setting an object conveying speed is characterized in that determining, by using the conveying speed level model, the conveying speed level of the object to be conveyed further includes: putting the minimum value of the feature data and the maximum value of the feature data into the conveying speed level model for calculation, respectively, and determining the conveying speed level of the object according to the maximum value among result values of the conveying speed level model when the feature index is smaller than the minimum value of the feature data or greater than the maximum value of the feature data.

In order to achieve the aforesaid object, according to a second aspect of the embodiment of the disclosure, an apparatus for setting an object conveying speed is provided, the apparatus being characterized by comprising: a relationship representation determining module and a conveying speed determining module; wherein the relationship representation determining module is used for acquiring historical feature data of an object within multiple predefined time periods, and constructing a conveying speed level model, which indicates a corresponding relationship between the historical feature data and a conveying speed level, and which further includes a feature index that indicates the conveying speed level; and the conveying speed determining module is used for acquiring feature data of an object to be conveyed, and determining, by using the conveying speed level model, the conveying speed level of the object to be conveyed; and determining the conveying speed of the object to be conveyed according to the conveying speed level.

In order to achieve the aforesaid object, according to a third aspect of the embodiment of the disclosure, an electronic device for setting an object conveying speed is provided, the electronic device being characterized by comprising: one or more processors; and a storage means for storing one or more programs, the one or more programs, when executed by the one or more processors, causing the one or more processors to implement any of the aforesaid methods for setting an object conveying speed.

In order to achieve the aforesaid object, according to a forth aspect of the embodiment of the disclosure, a computer-readable medium, on which a computer program is stored, is provided, the computer-readable medium being characterized in that the program, when executed by a processor, implements any of the aforesaid methods for setting an object conveying speed.

BRIEF DESCRIPTION OF THE DRAWINGS

Figures are used to better understand the disclosure, and do not form improper limitations of the disclosure. Where.

DETAILED DESCRIPTION

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

Figure 1:
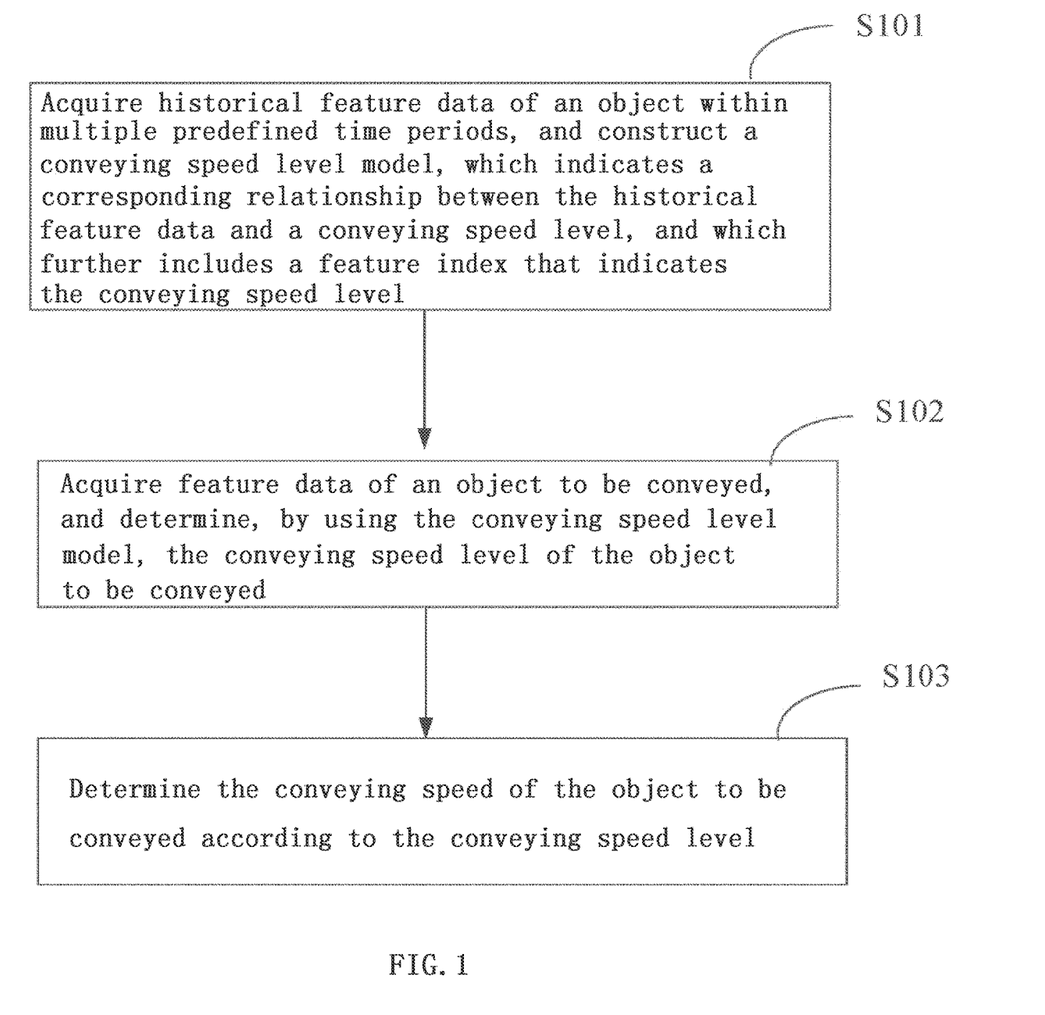
FIG. 1 is a schematic diagram of a flow of a method for setting an object conveying speed provided by a first embodiment of the disclosure.

As shown in FIG. 1, the embodiment of the disclosure provides a method for setting an object conveying speed, and the method may comprise the following steps:

Step S101: Acquire historical feature data of an object within multiple predefined time periods, and construct a conveying speed level model, which indicates a corresponding relationship between the historical feature data and a conveying speed level, and which further includes a feature index that indicates the conveying speed level.

To be specific, the historical feature data of the conveyed object on the conveying device within multiple predefined time periods is acquired, and the historical feature data is obtained by calculation from the quantity and weight of the objects based on a predefined formula, for example, (object weight*60%+object quantity*40%)/minute, i.e., the feature data includes the weight and quantity of the objects to be conveyed within one of the predefined time periods. It may be understood that the calculation method of the feature data of the object to be conveyed is the same as that of the historical feature data, i.e., the feature data of the object to be conveyed includes the weight and quantity of the objects to be conveyed within one of the predefined time periods. For example, one predefined time period is 1 minute, and there are several periods of 1 minute within multiple predefined time periods, such as 10 minutes, 30 minutes, etc. The disclosure does not limit the calculation method of the feature data formed by the predefined time period, the object quantity, and the object weight.

For example, data in Table 1 is taken as an example to illustrate the determination of the conveying speed level, where intervals of the feature data are determined according to the historical feature data within multiple predefined time periods, e.g., the historical feature data of the object within one hour or one day is formed by acquiring the historical feature data of the object conveyance per minute, the acquired historical feature data is processed, the conveying speed level is determined using a method of fuzzy classification, and the corresponding conveying speed levels, such as Level A, Upper Level B, Level B, Lower Level B, and Level C, are determined according to the intervals, as shown in Table 1 below:

TABLE 1

| Feature data | Level |
| --- | --- |
| [400, 500] | Level A |
| [240, 400] | Upper Level B |
| [180, 240] | Level B |
| [80, 180] | Lower Level B |
| [0, 80] | Level C |

Further, a conveying speed level model, which indicates a corresponding relationship between the historical feature data and a conveying speed level, and which further includes a feature index that indicates the conveying speed level, is constructed.

To be specific, the data shown in Table 1 is still taken as an example to illustrate the determination of the feature index of the conveying speed level, where as shown in Table 1, the interval of the feature data corresponding to Level A is [400, 500], and the median value 450 between 400 and 500 is taken as the feature index for determining the conveying speed level as Level A.

Preferably, the conveying speed level is achieved by an algorithm of fuzzy classification, and the Gaussian membership function as shown in Formula (1) is taken as an example. Further, the aforesaid feature index is put into the Gaussian membership function to form a conveying speed level model corresponding to Level A as shown in Formula (2), where 450 is the median value between the maximum value and the minimum value in the interval [400, 500] corresponding to Level A, i.e., it is the feature index of Level A, 50 is half of the result obtained by subtracting the minimum value from the maximum value in the aforesaid interval, and 450 and 50 are defined according to the variables in Formula (1). Formula (1)-Formula (6) are shown as follows:

$$f(x) = \exp\left(-\frac{(x-\mu)^2}{2\sigma^2}\right) \quad (1)$$

$$f(x) = \exp\left(-\frac{(x-450)^2}{2*50^2}\right) \quad (2)$$

$$f(x) = \exp\left(-\frac{(x-320)^2}{2*80^2}\right) \quad (3)$$

$$f(x) = \exp\left(-\frac{(x-210)^2}{2*30^2}\right) \quad (4)$$

$$f(x) = \exp\left(-\frac{(x-130)^2}{2*50^2}\right) \quad (5)$$

$$f(x) = \exp\left(-\frac{(x-40)^2}{2*40^2}\right) \quad (6)$$

To be specific, Formula (2) is the conveying speed level model corresponding to Level A, and has its feature index of 450; the rest is deduced in the same manner whereby Formula (3) is the conveying speed level model corresponding to Upper Level B, and has its feature index of 320; Formula (4) is the conveying speed level model corresponding to Level B, and has its feature index of 210; Formula (5) is the conveying speed level model corresponding to Lower Level B, and has its feature index of 130; and Formula (6) is the conveying speed level model corresponding to Level C, and has its feature index of 40. That is, a conveying speed level model, which indicates a corresponding relationship between the historical feature data and a conveying speed level, and which further includes a feature index that indicates the conveying speed level, is constructed.

The disclosure does not limit the specific algorithm and the specific formula based on fuzzy classification.

Step S102: Acquire feature data of an object to be conveyed, and determine, by using the conveying speed level model, the conveying speed level of the object to be conveyed.

To be specific, the feature data of the object to be conveyed is acquired, i.e., the weight and quantity of the objects to be conveyed within one of the predefined time periods is acquired; the obtainment can be achieved by means of an apparatus or device before the object enters a conveying device with a conveyor belt, e.g., the weight of a single package is obtained by means of an automatic sorter to form sorted data, the total weight and quantity of the packages within 1 minute are counted through the sorted data, and then the feature data within 10 minutes is counted. It may be understood that for packages that cannot be conveyed by the conveyor belt, such as packages having too large volumes and overweight packages, alarms may be given before the packages enter the conveyor belt, and such packages are handled uniformly, where the package is the object That is, the feature data of the object to be conveyed is acquired.

The speed level and the formula corresponding thereto illustrated in Table 1 in Step S101 are still taken as an example, it is assumed that the feature data of the object to be conveyed acquired within 1 minute is 100, and the feature data 100 is put into the conveying speed level model for calculation as the value of the independent variable, as shown below:

The result obtained by putting the value into Formula (2) is 0.0;

The result obtained by putting the value into Formula (3) is 0.0;

The result obtained by putting the value into Formula (4) is 0.00121;

The result obtained by putting the value into Formula (5) is 0.83527;

The result obtained by putting the value into Formula (6) is 0.32456.

As can be seen, the maximum value of the obtained result is 0.83527, which corresponds to Formula (5) that is the conveying speed level model corresponding to Lower Level B. That is, when the feature data is 100, the conveying speed level is determined as one corresponding to Lower Level B according to the aforesaid conveying speed level model, i.e., acquiring feature data of an object to be conveyed, and determining, by using the conveying speed level model, the conveying speed level of the object to be conveyed.

It may be understood that according to a model of fuzzy classification, after the feature classification according to the speed level, the speed level of the object to be conveyed has a membership relationship with the classified speed level, and it belongs to the classification with which it has a large degree of membership, so the membership relationship is determined according to the maximum value of the obtained result.

Step S103: Determine the conveying speed of the object to be conveyed according to the conveying speed level.

To be specific, the conveying speed level set in Table 1 in Step S101 is still taken as an example, and the conveying speed of the object to be conveyed is determined according to the conveying speed level, as shown in Table 2 below:

TABLE 2

| Speed level | Conveying speed |
| --- | --- |
| Level A | 350 rpm |
| Upper Level B | 300 rpm |
| Level B | 200 rpm |
| Lower Level B | 150 rpm |
| Level C | 100 rpm |

For example, as shown in the example of Step S102, when the feature data of the object to be conveyed is 100, it is determined that the object belongs to the conveying speed level corresponding to Lower Level B, and according to the corresponding relationship in Table 2, the conveying speed corresponding to Lower Level B is 150 rpm, so the object having the feature data of 100 will be conveyed at a speed of 150 rpm. It may be understood that 150 rpm is a speed representation, and is indicated as the speed of the conveyor belt by means of a running speed of a driving device of the conveyor belt.

It may be understood that the charts and formulae in the embodiment are examples, and the disclosure does not limit the number of the conveying speed levels, the maximum and minimum values within the level range, and the representation and value of the conveying speed corresponding to the level.

Figure 2:
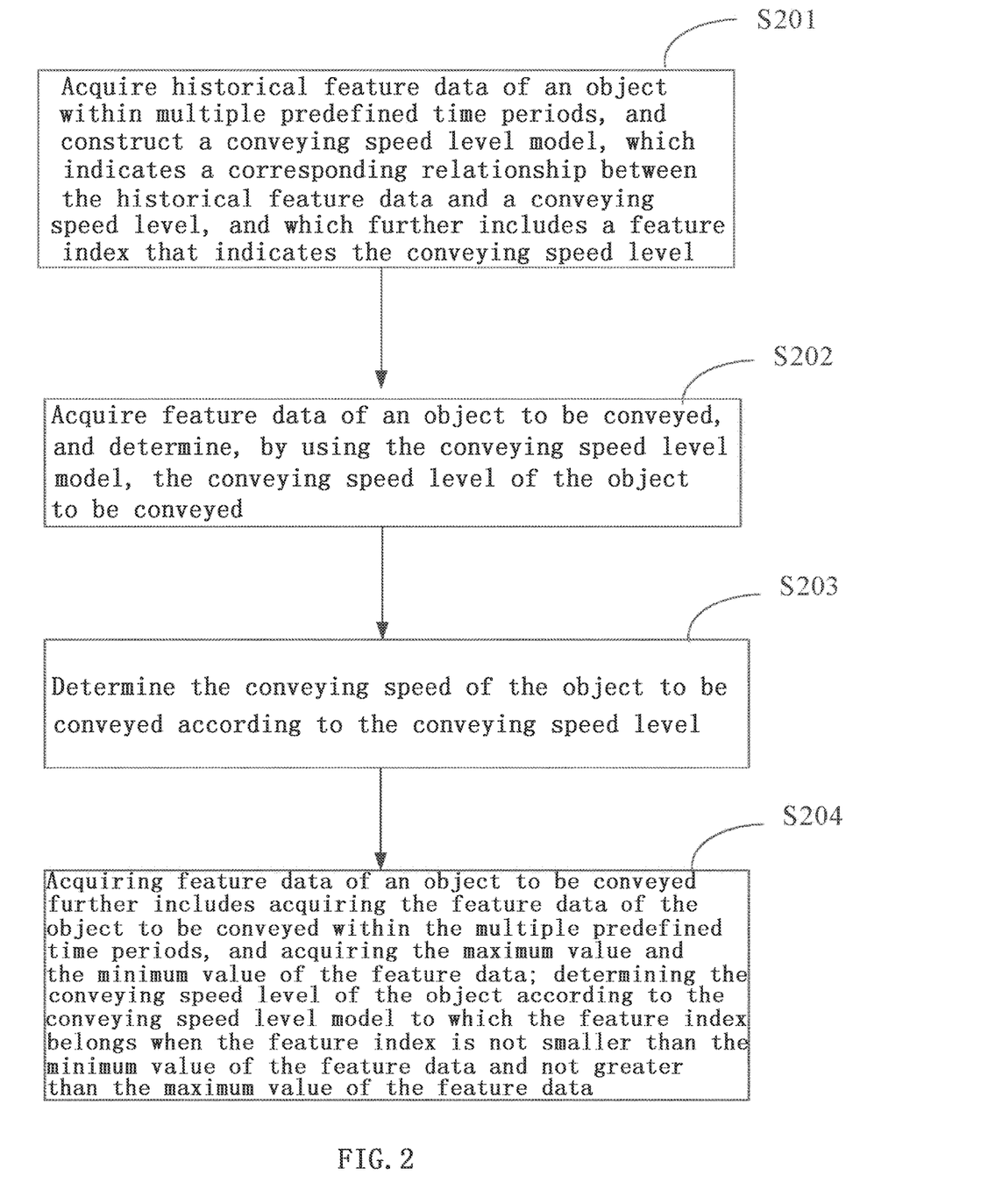
FIG. 2 is a schematic diagram of a flow of a method for setting an object conveying speed provided by a second embodiment of the disclosure.

As shown in FIG. 2, the embodiment of the disclosure provides a method for setting an object conveying speed, and the method may comprise the following steps:

The descriptions of Step S201-Step S203 are consistent with the descriptions of Step S101-Step S103, and no unnecessary details are further given herein.

Step S204: Acquiring feature data of an object to be conveyed further includes acquiring the feature data of the object to be conveyed within the multiple predefined time periods, and acquiring the maximum value and the minimum value of the feature data; determining the conveying speed level of the object according to the conveying speed level model to which the feature index belongs when the feature index is not smaller than the minimum value of the feature data and not greater than the maximum value of the feature data.

To be specific, when the feature data of the object to be conveyed within the multiple predefined time periods is acquired, the feature data is a data set composed of multiple pieces of feature data of the object. For example, assuming that the feature data acquired every 10 minutes is obtained according to the feature data acquired very minute, the feature data acquired every 10 minutes is a set containing the feature data acquired very minute within the 10 minutes, and the set contains 10 pieces of feature data. It may be understood that the feature data of the object within one or more predefined time periods is discrete data, and by processing the sorted data, e.g., removing data with a large discrete difference, an effective feature data set is acquired from multiple pieces of discrete data, and the maximum and minimum values are obtained in the data set. That is, acquiring feature data of an object to be conveyed further includes acquiring the feature data of the object to be conveyed within the multiple predefined time periods, and acquiring the maximum value and the minimum value of the feature data.

Further, the conveying speed level of the object is determined according to the conveying speed level model to which the feature index belongs when the feature index is not smaller than the minimum value of the feature data and not greater than the maximum value of the feature data.

To be specific, the five feature indexes described in Step S101 are compared with the maximum value and the minimum value of the feature data, respectively, and when there is a feature index that is smaller than the maximum value contained in the feature data set and greater than the minimum value contained in the feature data set, the conveying speed level to which the object to be conveyed acquired within the 10 minutes belongs is determined, and the conveying speed of the object is determined according to the conveying speed level model to which the feature index belongs.

Figure 3:
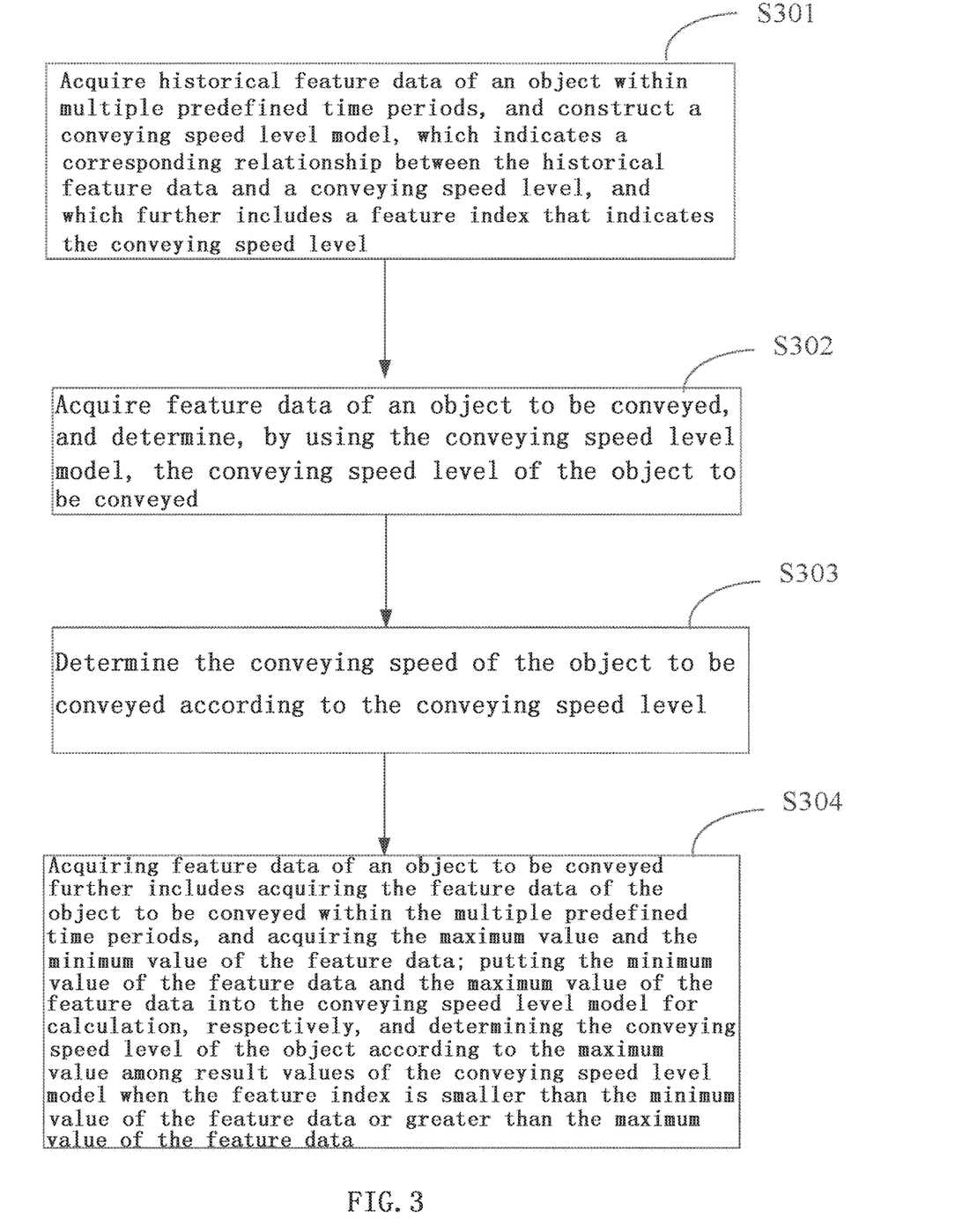
FIG. 3 is a schematic diagram of a flow of a method for setting an object conveying speed provided by a third embodiment of the disclosure.

As shown in FIG. 3, the embodiment of the disclosure provides a method for setting an object conveying speed, and the method may comprise the following steps:

The descriptions of Step S301-Step S303 are consistent with the descriptions of Step S101-Step S103, and no unnecessary details are further given herein.

Step S304: Acquiring feature data of an object to be conveyed further includes acquiring the feature data of the object to be conveyed within the multiple predefined time periods, and acquiring the maximum value and the minimum value of the feature data; putting the minimum value of the feature data and the maximum value of the feature data into the conveying speed level model for calculation, respectively, and determining the conveying speed level of the object according to the maximum value among result values of the conveying speed level model when the feature index is smaller than the minimum value of the feature data or greater than the maximum value of the feature data.

To be specific, when the feature data of the object to be conveyed within the multiple predefined time periods is acquired, the feature data is a data set composed of multiple pieces of feature data of the object. For example, assuming that the feature data acquired every 10 minutes is obtained according to the feature data acquired very minute, the feature data acquired every 10 minutes is a set containing the feature data acquired every minute within the 10 minutes. It may be understood that the feature data of the object within one or more predefined time periods is discrete data, and by processing the sorted data, e.g., removing data with a large discrete difference, an effective feature data set is acquired from multiple pieces of discrete data, and the maximum and minimum values are obtained in the data set. That is, acquiring feature data of an object to be conveyed further includes acquiring the feature data of the object to be conveyed within the multiple predefined time periods, and acquiring the maximum value and the minimum value of the feature data.

Further, the minimum value of the feature data and the maximum value of the feature data are put into the conveying speed level model for calculation, respectively, and the conveying speed level of the object is determined according to the maximum value among result values of the conveying speed level model when the feature index is smaller than the minimum value of the feature data or greater than the maximum value of the feature data.

The five feature indexes described in Step S101 are compared with the maximum value and the minimum value of the feature data, respectively, and when the five feature indexes are all smaller than the minimum value of the feature data or greater than the maximum value of the feature data, the minimum value of the feature data and the maximum value of the feature data are put into the conveying speed level model, i.e., Formula (2) to Formula (6) described in Step S101, respectively, to obtain the result values obtained by putting the minimum value of the feature data and the maximum value of the feature data into the conveying speed level model for calculation, the maximum value among the obtained result values is taken, and so on to obtain the maximum value among the result values in Formula (2) to Formula (6).

It may be understood that according to a model of fuzzy classification, after the feature classification according to the speed level, the speed level of the object to be conveyed has a membership relationship with the classified speed level, and it belongs to the classification with which it has a large degree of membership, so the membership relationship is determined according to the maximum value of the obtained result.

Figure 4:
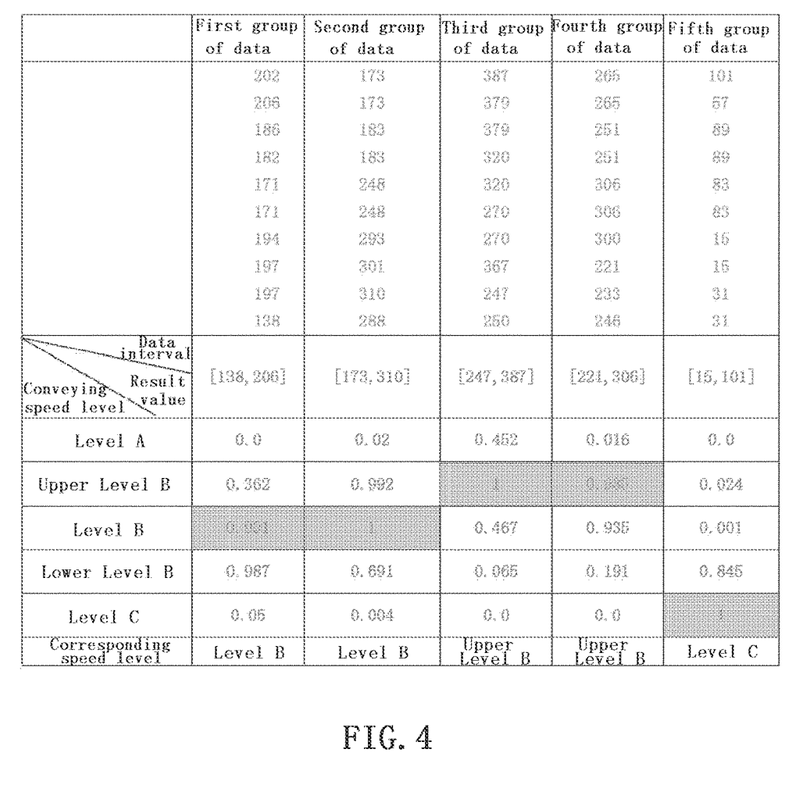
FIG. 4 shows a group of exemplary data for setting an object conveying speed provided by one embodiment of the disclosure.

As shown in FIG. 4, the embodiment of the disclosure provides an exemplary data set of a method for setting an object conveying speed, as shown in FIG. 4.

To be specific, in combination with the examples described in Steps S101-S103, the data shown in FIG. 4 is taken as an example to further illustrate Step S204. Assuming that the second group of data as shown in FIG. 4 is involved, the feature data acquired every 10 minutes is a set containing the feature data acquired every minute within the 10 minutes, where the maximum value is 310 and the minimum value is 173, which is represented as [173, 310]. It may be known from Step S101 that in the example, five conveying speed levels, which correspond to five conveying speed level models and five predefined feature indexes, are set according to the historical feature data. It may be known by comparison that the feature index corresponding to Level B is 210, which is greater than 173 and smaller than 310, so it may be determined that the conveying speed level of the object having the group of data is Level B, and the conveying speed thereof is 200 rpm.

That is, acquiring feature data of an object to be conveyed further includes acquiring the feature data of the object to be conveyed within the multiple predefined time periods, and acquiring the maximum value and the minimum value of the feature data; determining the conveying speed level of the object according to the conveying speed level model to which the feature index belongs when the feature index is not smaller than the minimum value of the feature data and not greater than the maximum value of the feature data.

Further, acquiring feature data of an object to be conveyed further includes acquiring the feature data of the object to be conveyed within the multiple predefined time periods, and acquiring the maximum value and the minimum value of the feature data; putting the minimum value of the feature data and the maximum value of the feature data into the conveying speed level model for calculation, respectively, and determining the conveying speed level of the object according to the maximum value among result values of the conveying speed level model when the feature index is smaller than the minimum value of the feature data or greater than the maximum value of the feature data.

To be specific, in combination with the examples described in Steps S101-S103, the data shown in FIG. 4 is taken as an example to further illustrate Step S304. Assuming For the first group of data as shown in FIG. 4 is involved, the feature data acquired every 10 minutes is a set containing the feature data acquired every minute within the 10 minutes, where the maximum value is 206 and the minimum value is 138, which is represented as [138, 206]. It may be known from Step S101 that in the example, five conveying speed levels, which correspond to five conveying speed level models and five predefined feature indexes, are set according to the historical feature data. It may be known by comparison that there is no feature index, which is greater than 138 and smaller than 206, so x is made to be 138 and 206, respectively, which values are put into the conveying speed level model formulae (2) to (6) described in Step S101, and if the results obtained when x is 138 and 206 are not equal, the greater value obtained when x is 138 and 206 is taken, thereby obtaining result values as shown in FIG. 4. That is, when 138 and 206 are put into Formula (2), the two values obtained are equal, i.e., 0.0, and when 138 and 206 are put into Formula (3), the two values obtained are not equal, and the greater value, i.e., 0.362, is taken. Similarly, when the values are put into Formula (4), 0.991 is obtained, when the values are put into Formula (5), 0.987 is obtained, and when the values are put into Formula (6), 0.005 is obtained. The maximum value among these values is 0.991.

Further, it may be known that it is Formula (4) that obtains the result of 0.991, which corresponds to Level B of the conveying speed levels, and as shown in the example in Step S103, a conveying rate is determined according to the conveying speed level, so the conveying rate of the object forming the first group of data is 200 rpm.

Figure 5:
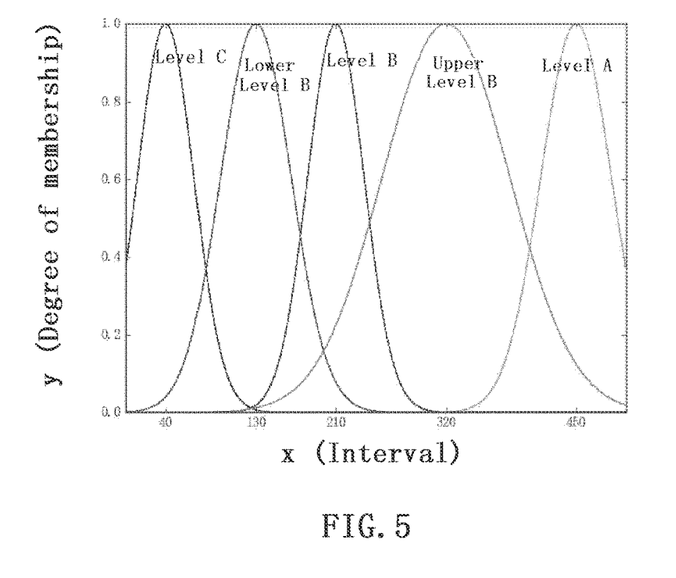
FIG. 5 shows an image of a Gaussian membership function provided by one embodiment of the disclosure.

As may be known from the image of the Gaussian membership function as shown in FIG. 5, the range of the value domains of Formula (2)-Formula (6) above is [0, 1]. It may be understood that when the value of one of the formulae can be made to be 1, the group of data has the highest degree of membership with the formula; when the value of any of the formulae cannot be made to be 1, the maximum value among the result values obtained by calculation using Formula (2)-Formula (6) is considered as one having the highest degree of membership with the formula as compared with those with the other formulae.

That is, acquiring feature data of an object to be conveyed further includes acquiring the feature data of the object to be conveyed within the multiple predefined time periods, and acquiring the maximum value and the minimum value of the feature data;
determining, by using the conveying speed level model, the conveying speed level of the object to be conveyed includes: determining the conveying speed level of the object according to the conveying speed level model to which the feature index belongs when the feature index is not smaller than the minimum value of the feature data and not greater than the maximum value of the feature data;
determining, by using the conveying speed level model, the conveying speed level of the object to be conveyed further includes: putting the minimum value of the feature data and the maximum value of the feature data into the conveying speed level model for calculation, respectively, and determining the conveying speed level of the object according to the maximum value among result values of the conveying speed level model when the feature index is smaller than the minimum value of the feature data or greater than the maximum value of the feature data.

Figure 6:
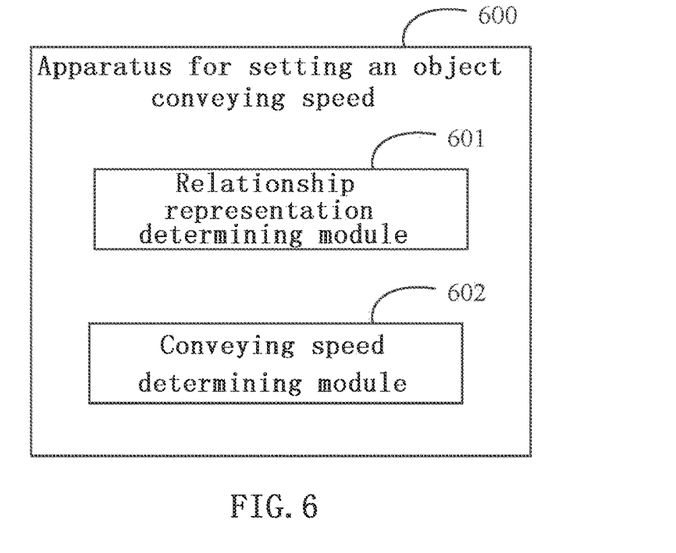
FIG. 6 is a schematic diagram of a structure of a system for setting an object conveying speed provided by one embodiment of the disclosure.

As shown in FIG. 6, the embodiment of the disclosure provides an apparatus 600 for setting an object conveying speed, comprising: a relationship representation determining module 601 and a conveying speed determining module 602; wherein the relationship representation determining module 601 is used for acquiring historical feature data of an object within multiple predefined time periods, and constructing a conveying speed level model, which indicates a corresponding relationship between the historical feature data and a conveying speed level, and which further includes a feature index that indicates the conveying speed level; and the conveying speed determining module 602 is used for acquiring feature data of an object to be conveyed, and determining, by using the conveying speed level model, the conveying speed level of the object to be conveyed; and determining the conveying speed of the object to be conveyed according to the conveying speed level.

Optionally, the relationship representation determining module 601 includes that the feature data of the object to be conveyed includes the weight and quantity of the objects to be conveyed within one of the predefined time periods.

Optionally, the relationship representation determining module 601 is used for acquiring feature data of an object to be conveyed, which further includes acquiring the feature data of the object to be conveyed within the multiple predefined time periods, and acquiring the maximum value and the minimum value of the feature data.

Optionally, the conveying speed determining module 602 is used for determining, by using the conveying speed level model, the conveying speed level of the object to be conveyed, which includes: determining the conveying speed level of the object according to the conveying speed level model to which the feature index belongs when the feature index is not smaller than the minimum value of the feature data and not greater than the maximum value of the feature data.

Optionally, the conveying speed determining module 602 is used for determining, by using the conveying speed level model, the conveying speed level of the object to be conveyed, which includes: determining the conveying speed level of the object according to the conveying speed level model to which the feature index belongs when the feature index is not smaller than the minimum value of the feature data and not greater than the maximum value of the feature data.

The embodiment of the disclosure further provides an electronic device for setting an object conveying speed, comprising: one or more processors; and a storage means for storing one or more programs, the one or more programs, when executed by the one or more processors, causing the one or more processors to implement the method provided by any of the aforesaid embodiments.

The embodiment of the disclosure further provides a computer-readable medium, on which a computer program is stored, wherein the program, when executed by a processor, implements the method provided by any of the aforesaid embodiments.

Figure 7:
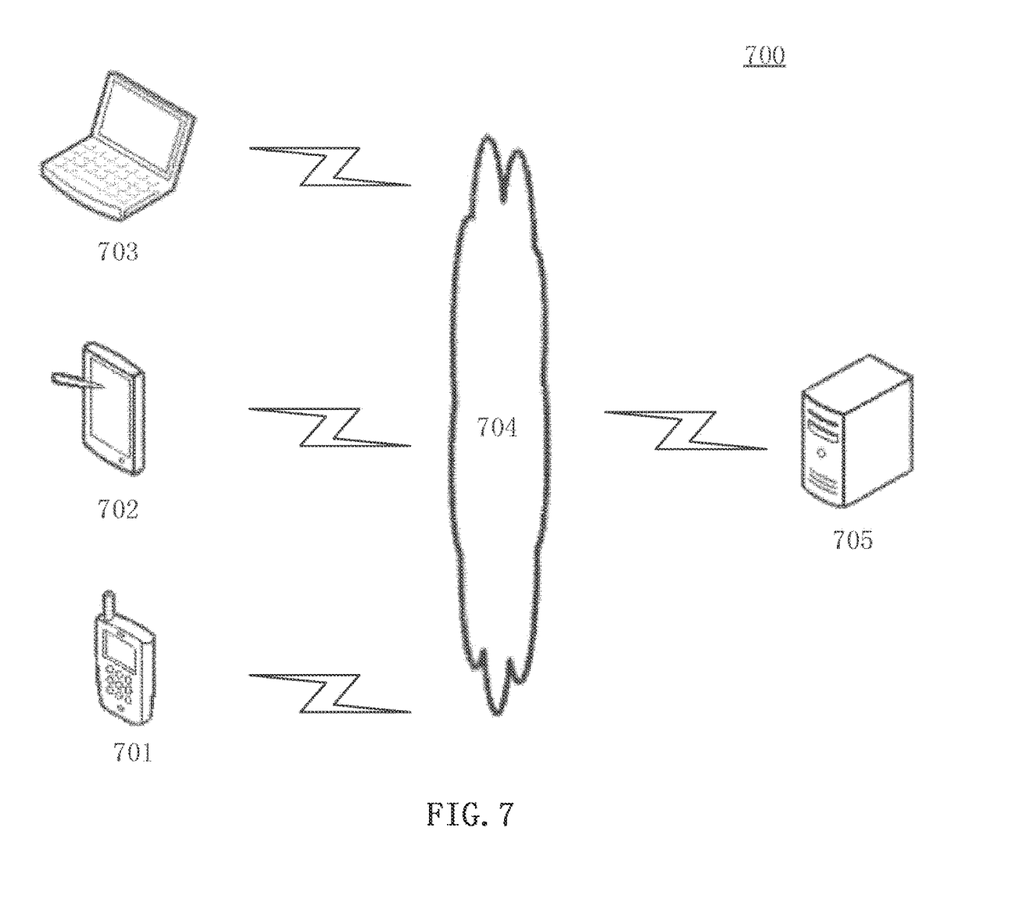
FIG. 7 is an exemplary system architecture diagram to which an embodiment of the disclosure can be applied.

FIG. 7 shows an exemplary system architecture 700 to which a method for setting an object conveying speed or an apparatus for setting an object conveying speed according to an embodiment of the disclosure can be applied.

As shown in FIG. 7, the system architecture 700 may comprise terminal devices 701, 702, 703, a network 704, and a server 705. The network 704 is a medium for providing a communication link between the terminal devices 701, 702, 703 and the server 705. The network 704 may include various connection types, such as wired or wireless communication links, or fiber-optic cables.

The user may use the terminal devices 701, 702, 703 to interact with the server 705 through the network 704 to receive or send messages and so on. Various communication client applications, such as web browser applications, search applications, instant messaging tools, email clients, and so on, may be installed on the terminal devices 701, 702, 703.

The terminal devices 701, 702, 703 may be various electronic devices having screens and supporting web browsing, including but not limited to smart phones, tablet computers, laptop portable computers, desktop computers, and so on.

The server 705 may be a server that provides various services, such as a background server that processes feature data of an object acquired by the user using the terminal devices 701, 702, 703. The background server may process, for example, analyze the received feature data of the object, and feed the obtained conveying speed back to the terminal devices.

It shall be noted that the method for setting an object conveying speed provided by the embodiment of the disclosure is generally performed by the server 705, and correspondingly, the apparatus for setting an object conveying speed is generally provided in the server 705.

It should be understood that the numbers of the terminal devices, the networks, and the servers in FIG. 7 are merely schematic. According to implementation requirements, there may be any numbers of terminal devices, networks, and servers.

Figure 8:
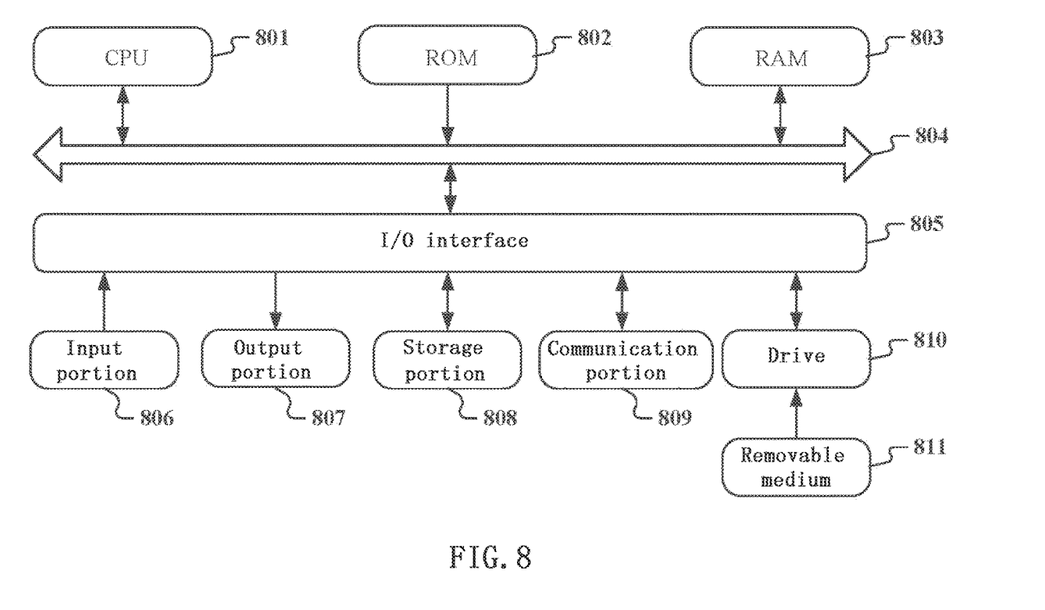
FIG. 8 is a schematic diagram of a structure of a computer system suitable for implementing a terminal device or a server according to an embodiment of the disclosure.

Reference is now made to FIG. 8, which shows a schematic diagram of a structure of a computer system 800 suitable for implementing a terminal device according to an embodiment of the disclosure. The terminal device shown in FIG. 8 is only an example, and shall not impose any limitation on the functions and the scope of use of the embodiment of the disclosure.

As shown in FIG. 8, the computer system 800 includes a central processing unit (CPU) 801, which may perform various appropriate actions and processes according to a program stored in a read-only memory (ROM) 802 or a program loaded from a storage portion 808 into a random access memory (RAM) 803. Various programs and data required for the operation of the system 800 are also stored in the RAM 803. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse, and so on; an output portion 807 including a cathode ray tube (CRT), a liquid crystal display (LCD) and so on, and a speaker and so on; a storage portion 808 including a hard disk and so on; and a communication portion 809 including a network interface card such as a LAN card, a modem, and so on. The communication portion 809 performs communication processing via a network such as the Internet. A drive 810 is also connected to the I/O interface 805 according to requirements. A removable medium 811, such as a magnetic disk, an optical disk, a magneto-optical disk, a semiconductor memory, and so on, is installed on the drive 810 according to requirements so that a computer program read therefrom is installed in the storage portion 808 according to requirements.

In particular, according to the embodiment disclosed in the disclosure, the process described above with reference to the flowchart may be implemented as a computer software program. For example, the embodiment of the disclosure includes a computer program product, which includes a computer program carried on a computer-readable medium, the computer program containing a program code for performing the method shown in the flowchart. In such embodiment, the computer program may be downloaded and installed from the network through the communication portion 809, and/or installed from the removable medium 811. When the computer program is executed by the central processing unit (CPU) 801, the aforesaid functions defined in the system according to the disclosure are executed.

It shall be noted that the computer-readable medium shown in the disclosure may be a computer-readable signal medium or a computer-readable storage medium or any combination of the aforesaid two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt multiple forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program used by or in combination with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules and/or units described in the embodiment of the disclosure may be implemented by software or hardware. The described modules and/or units may be also provided in a processor. For example, descriptions may be made as follows: an apparatus for setting an object conveying speed, characterized by comprising: a relationship representation determining module and a conveying speed determining module. The names of these modules do not form limitations of the modules themselves in some cases. For example, the relationship representation determining module may be also descried as a "module for constructing a speed level model according to historical feature data of an object".

As another aspect, the disclosure also provides a computer-readable medium, which may be included in the devices described in the aforesaid embodiment, or may exist independently without being assembled into the devices. The aforesaid computer-readable medium carries one or more programs, and the aforesaid one or more programs, when executed by one of the devices, cause the device to include: acquiring historical feature data of an object within multiple predefined time periods, and constructing a conveying speed level model, which indicates a corresponding relationship between the historical feature data and a conveying speed level, and which further includes a feature index that indicates the conveying speed level; acquiring feature data of an object to be conveyed, and determining, by using the conveying speed level model, the conveying speed level of the object to be conveyed; and determining the conveying speed of the object to be conveyed according to the conveying speed level.

According to the technical solution of the embodiment of the disclosure, factors that affect a speed of a conveying device can be graded, and the conveying speed of the conveying device is set by means of a relationship between the level and the conveying speed within a preset time period, so as to achieve intelligent adjustment of the conveying speed of the conveying device, thereby reducing the conveying cost of the conveying device, and improving the conveying efficiency of the conveying device.

The aforesaid specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. A method for setting an object conveying speed, comprising:
acquiring historical feature data of an object within multiple predefined time periods, and constructing a conveying speed level model, which indicates a corresponding relationship between the historical feature data and a conveying speed level, and which further includes a feature index that indicates the conveying speed level;
acquiring feature data of an object to be conveyed, and determining, by using the conveying speed level model, the conveying speed level of the object to be conveyed; and
determining the conveying speed of the object to be conveyed according to the conveying speed level,
wherein,
determining, by using the conveying speed level model, the conveying speed level of the object to be conveyed further includes:
when the feature index is smaller than the minimum value of the feature data or greater than the maximum value of the feature data, putting the minimum value of the feature data and the maximum value of the feature data into the conveying speed level model for calculation, respectively, and determining the conveying speed level of the object according to the maximum value among result values of the conveying speed level model.

2. The method according to claim 1, wherein
the feature data of the object to be conveyed includes the weight and quantity of the objects to be conveyed within one of the predefined time periods.

3. The method according to claim 2, wherein
acquiring feature data of an object to be conveyed further includes:
acquiring the feature data of the object to be conveyed within the multiple predefined time periods, and acquiring the maximum value and the minimum value of the feature data.

4. The method according to claim 3, wherein
determining, by using the conveying speed level model, the conveying speed level of the object to be conveyed includes:
determining the conveying speed level of the object according to the conveying speed level model to which the feature index belongs, when the feature index is not smaller than the minimum value of the feature data and not greater than the maximum value of the feature data.

5. An electronic device for setting an object conveying speed, comprising:
one or more processors; and
a storage means for storing one or more programs,
the one or more programs, when executed by the one or more processors, causing the one or more processors to implement:
acquiring historical feature data of an object within multiple predefined time periods, and constructing a conveying speed level model, which indicates a corresponding relationship between the historical feature data and a conveying speed level, and which further includes a feature index that indicates the conveying speed level;
acquiring feature data of an object to be conveyed, and determining, by using the conveying speed level model, the conveying speed level of the object to be conveyed; and
determining the conveying speed of the object to be conveyed according to the conveying speed level,
wherein,
determining, by using the conveying speed level model, the conveying speed level of the object to be conveyed further includes:
when the feature index is smaller than the minimum value of the feature data or greater than the maximum value of the feature data, putting the minimum value of the feature data and the maximum value of the feature data into the conveying speed level model for calculation, respectively, and determining the conveying speed level of the object according to the maximum value among result values of the conveying speed level model.

6. The electronic device according to claim 5, wherein:
the feature data of the object to be conveyed includes the weight and quantity of the objects to be conveyed within one of the predefined time periods.

7. The electronic device according to claim 6, wherein:

acquiring feature data of an object to be conveyed further includes:

acquiring the feature data of the object to be conveyed within the multiple predefined time periods, and acquiring the maximum value and the minimum value of the feature data.

8. The electronic device according to claim 7, wherein:

determining, by using the conveying speed level model, the conveying speed level of the object to be conveyed includes:

determining the conveying speed level of the object according to the conveying speed level model to which the feature index belongs, when the feature index is not smaller than the minimum value of the feature data and not greater than the maximum value of the feature data.

9. A computer-readable medium, on which a computer program is stored, wherein the program, when executed by a processor, implements the method for setting an object conveying speed, comprising:

acquiring historical feature data of an object within multiple predefined time periods, and constructing a conveying speed level model, which indicates a corresponding relationship between the historical feature data and a conveying speed level, and which further includes a feature index that indicates the conveying speed level;

acquiring feature data of an object to be conveyed, and determining, by using the conveying speed level model, the conveying speed level of the object to be conveyed; and determining the conveying speed of the object to be conveyed according to the conveying speed level, wherein, determining, by using the conveying speed level model, the conveying speed level of the object to be conveyed further includes:

when the feature index is smaller than the minimum value of the feature data or greater than the maximum value of the feature data, putting the minimum value of the feature data and the maximum value of the feature data into the conveying speed level model for calculation, respectively, and determining the conveying speed level of the object according to the maximum value among result values of the conveying speed level model.

10. The computer-readable medium according to claim 9, wherein the feature data of the object to be conveyed includes the weight and quantity of the objects to be conveyed within one of the predefined time periods.

11. The computer-readable medium according to claim 10, wherein acquiring feature data of an object to be conveyed further includes:

acquiring the feature data of the object to be conveyed within the multiple predefined time periods, and acquiring the maximum value and the minimum value of the feature data.

12. The computer-readable medium according to claim 11, wherein determining, by using the conveying speed level model, the conveying speed level of the object to be conveyed includes:

determining the conveying speed level of the object according to the conveying speed level model to which the feature index belongs, when the feature index is not smaller than the minimum value of the feature data and not greater than the maximum value of the feature data.

* * * * *